W. M. CLARK.
TALKING MOVING PICTURE APPARATUS.
APPLICATION FILED JULY 12, 1915. RENEWED MAY 23, 1921.
1,388,515.
Patented Aug. 23, 1921.
3 SHEETS—SHEET 2.
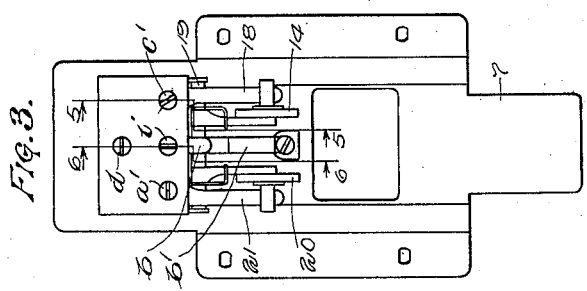
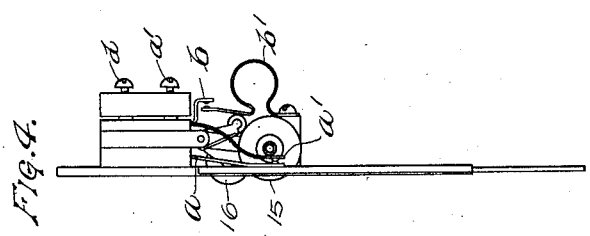
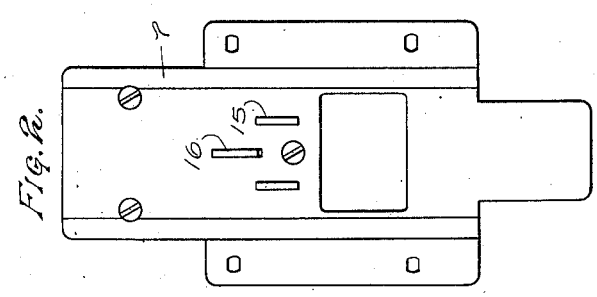
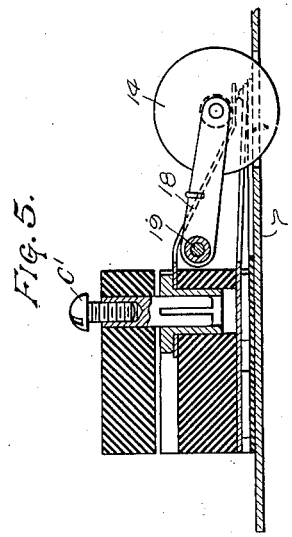
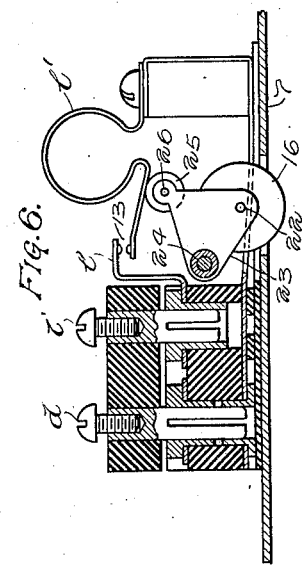
INVENTOR:
W. M. Clark
ATTORNEY.

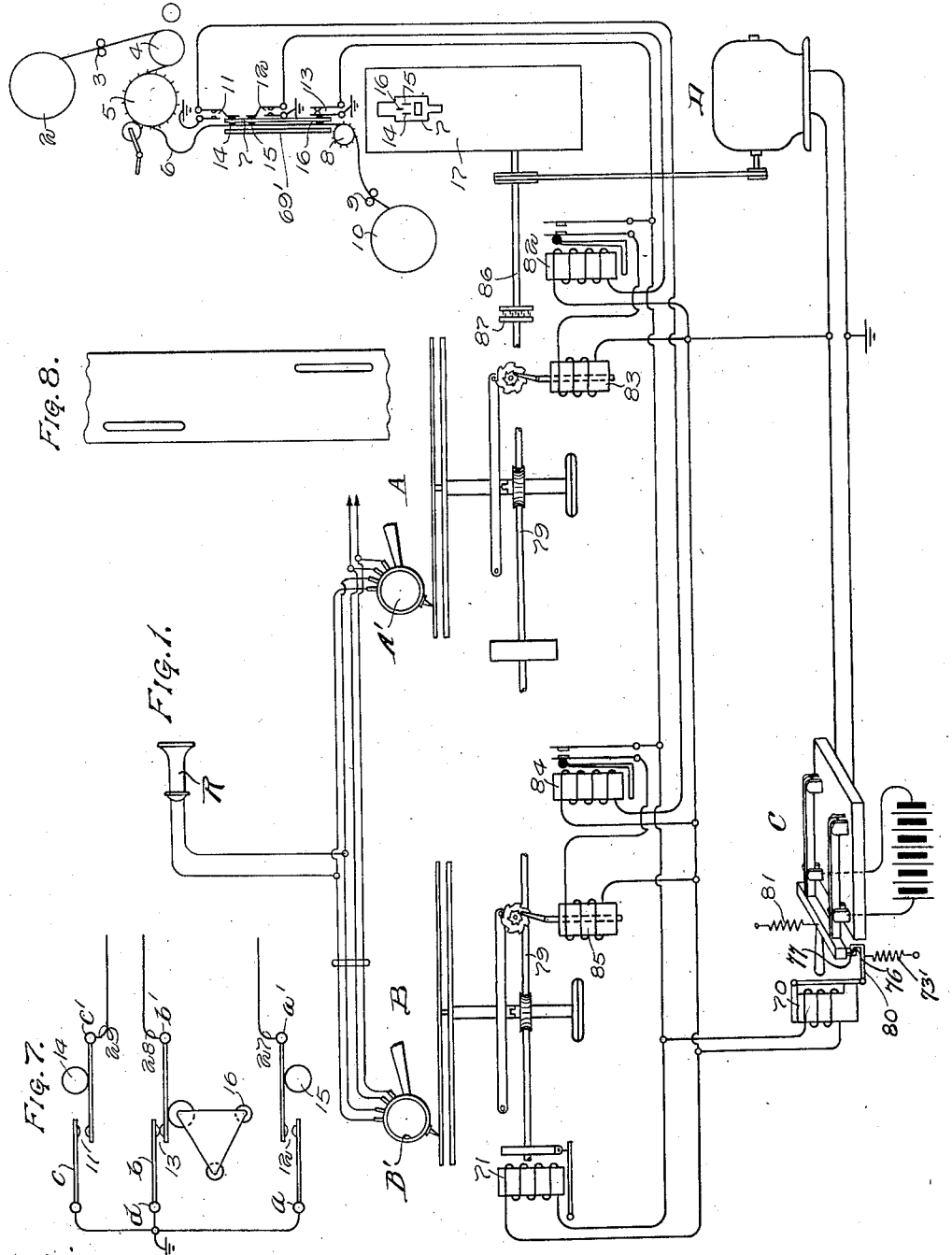

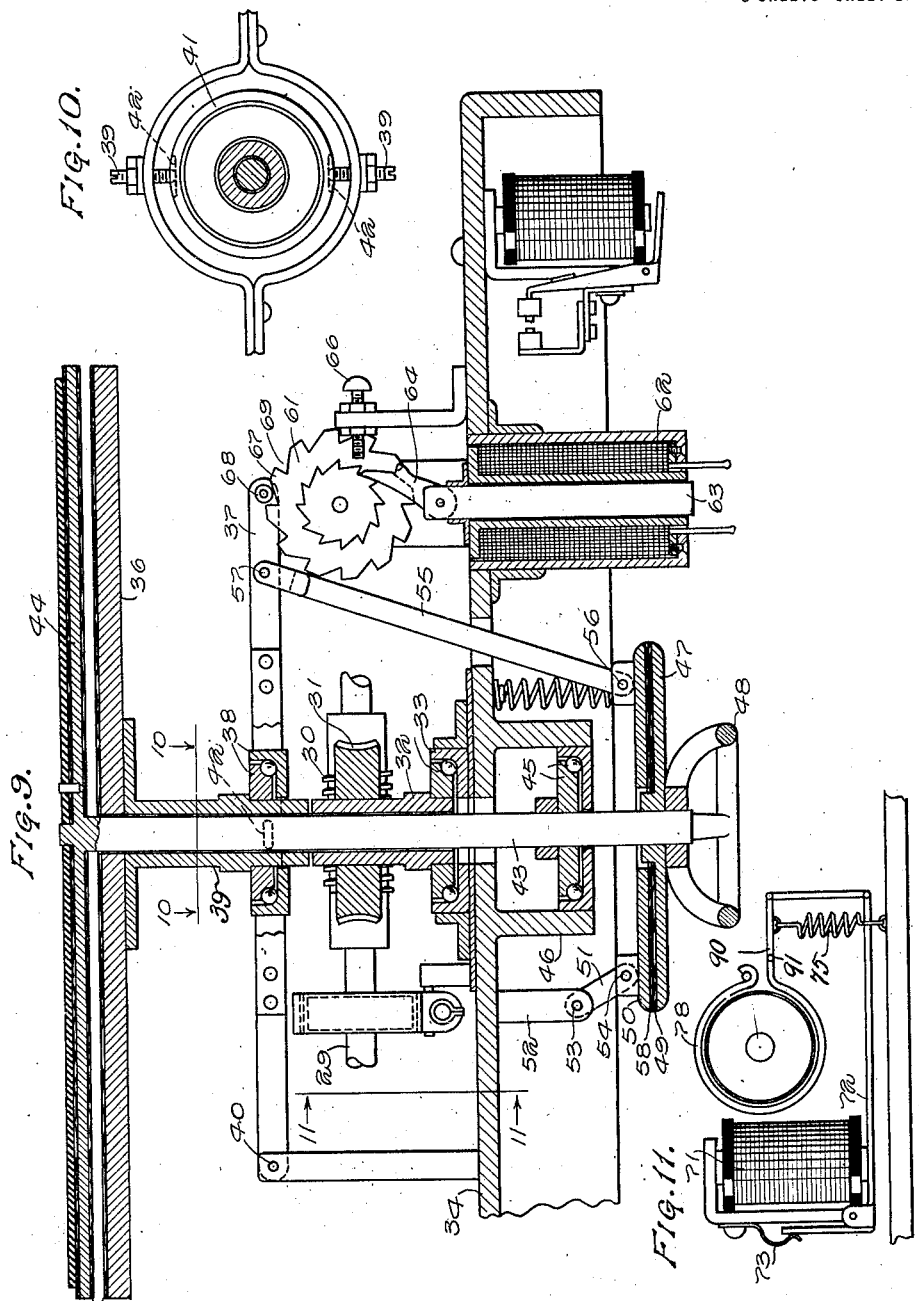

UNITED STATES PATENT OFFICE.

WILLIAM M. CLARK, OF CHICAGO, ILLINOIS.

TALKING MOVING-PICTURE APPARATUS.

1,388,515.   Specification of Letters Patent.   Patented Aug. 23, 1921.

Application filed July 12, 1915, Serial No. 39,326. Renewed May 23, 1921. Serial No. 471,968.

*To all whom it may concern:*

Be it known that I, WILLIAM M. CLARK, a citizen of the United States of America, and resident of Chicago, Cook county, Illinois, have invented a certain new and useful Improvement in Talking Moving-Picture Apparatus, of which the following is a specification.

My invention relates to an improved form of phonographic apparatus which is specially applicable for use in connection with moving picture apparatus. Heretofore there has been a great deal of difficulty in working phonographic apparatus satisfactorily in synchronism with a moving picture projector, and I have a device and new means for running the two in a satisfactory and reliable manner.

Among the objects of my invention are: the provision of improved means for controlling the phonographic apparatus from films; the provision of means whereby all of the controlling means allotted to the projector is mounted upon the aperture plate; the provision of means, in a device of the above character in which the phonograph apparatus is driven by higher speed mechanism than the projector shaft, for applying a brake to the higher speed mechanism for stopping both the phonographic equipment and the projector equipment; the provision of a special brake between the point of application of the brake and the projector driving shaft; and the provision of certain details and features of improvement tending to increase the efficiency and serviceability of apparatus of the above character.

To accomplish the foregoing and other useful ends I provide means hereinafter more fully set forth and claimed.

Figure 1 is a lay-out showing in a general way the relation between the projector, film, circuits, and other devices for controlling the phonographic apparatus.

Fig. 2 shows the aperture plate in front view.

Fig. 3 is a rear view of the same.

Fig. 4 is a side view of the same.

Fig. 5 is a section on line 5—5, Fig. 3.

Fig. 6 is a section on line 6—6, Fig. 3.

Fig. 7 shows diagrammatically the circuit connections on the aperture plate.

Fig. 8 shows the film with the controlling aperture openings therein.

Fig. 9 shows in detail the driving and controlling mechanism in the phonograph apparatus.

Fig. 10 is a detail of one of the bearings in Fig. 9, showing how the casing is pivoted.

Fig. 11 shows in detail the mechanism of a Raymond brake magnet.

Referring to the drawing, Fig. 1, the film is shown extending from the reel 2 through the fire rollers 3, around the tension roller 4 and around the sprocket wheel 5, beyond which it forms the loop 6, after which it passes through the aperture plate 7, and thence around the intermittent sprocket wheel 8 and fire wheel 9 to the intake wheel 10. Behind the aperture plate 7 there are provided three sets of springs, 11, 12 and 13.

The springs 11 are controlled by a roller 14 which is mounted on one end of a pivoted arm or spring and normally tend to assume a position inside a corresponding slot in the aperture plate due to the tension from one of the springs 11 or from any other suitable spring. Similarly the springs 12 are controlled by a roller 15 which also normally, and for the same reason, tends to assume a position within a slot in the aperture plate. Likewise the springs 13 are controlled by a roller 16, which also normally tends to assume a position within a slot in the aperture plate. When the film is in position, however, these rollers are ordinarily pressed back as shown in Fig. 1. In this figure, the springs 11, 12 and 13 are not shown in their actual relative positions. However, within the square 17, which represents the projector, the aperture plate 7 is shown in front view and the true relative positions of the rollers 14, 15 and 16 are shown, behind which, of course, the springs which they control are mounted. Each one of the rollers 14, 15 and 16 is provided with a ridge on the periphery, which engages the film. Along the film at suitable intervals there are provided apertures or punctures, one set in line with each one of the ridges. Whenever a puncture arrives opposite a ridge the ridge drops through the film thereby causing the springs behind the roller to vary their position. Some of these springs are so adjusted that when its controlling wheel meets a puncture a circuit is closed. Another wheel when it meets a puncture may cause a circuit to be opened. In each one of the circuits which is controlled by each one of these rollers there may be provided any suitable electromagnet for controlling any suitable apparatus.

For example, associated with the aperture plate 7 there are shown in Fig. 1 a couple of phonographs A and B and also a circuit breaker C.

As the circuits indicate the phonograph A is controlled through the medium of the springs 12 and the roller 15; the phonograph B is controlled through the medium of the springs 11 and the roller 14; whereas the circuit breaker C is controlled through the medium of the springs 13 and the roller 16.

In Fig. 2, the aperture plate 7 is shown in larger dimensions and, therefore, shows the relative location of the rollers and it also shows, of course, the windows in the aperture plate through which the rollers project into the path of the film.

Referring to Figs. 2, 3, 4, 5, 6 and 7, it will be seen that the roller 14 is rotatably mounted on the end of the arm 18, which arm is pivotally sustained on the shaft 19. Similarly, the roller 15 is rotatably mounted on the arm 21, which is in turn pivotally mounted upon the pin 19. On the other hand the roller 16 (see Fig. 6) is rotatably mounted on the pin 22 on the triangular frame 23. This triangular frame is pivotally mounted on the pin 24 and it carries on the corner opposite the one that carries the roller 16 an auxiliary roller 25 rotatably mounted on the pin 26.

Referring to Fig. 7, it will be seen that the springs $a$, $b$ and $c$ are all connected to a common terminal and to the grounded end of the battery, whereas the corresponding springs $a'$, $b'$ and $c'$ are connected respectively to the circuit conductors 27, 28 and 28'. It will be seen also that all of the springs $a$, $b$ and $c$ have a common terminal $d$.

The mechanism through the medium of which the phonograph is controlled is as follows: Referring to Fig. 9 the shaft 29 is the driving shaft and carries a worm gear 30. This worm gear engages the gear wheel 31, which is rigidly secured to the hollow shaft 32. This shaft 32 is sustained by the bearings 33, which is in turn secured to a main frame 34. Locked in driving engagement with the shaft 32 is the hollow shaft 35, to which is permanently secured the fly wheel 36. This shaft 35 may be raised and lowered, while in driving engagement with the shaft 32, through the medium of the lever 37. Upon this lever 37 is pivotally mounted the bearings 38, which sustain the shaft 35. These bearings, as shown in Fig. 10, are supported by the trunnions 39, so that the rotary movements of the lever 37 about the pivot 40 to which the shaft is secured will not operate to throw the shaft 35 out of alinement. The trunnions 39 engage the housing 41 of the bearings 38 in horizontal slots 42, so as to permit the trunnions 39 to move from left to right and from right to left, as the lever 37 rises and falls. Within the hollow shafts 32 and 35 there is a shaft 43, to the upper end of which there is attached the disk supporting plate 44. This shaft and disk are made of light material, so as to insure a low inertia, in order that the plate 44 may be started and stopped very quickly. The shaft 43 is provided with bearings 45 in a suitable housing 46, which is built upon the under side of the main frame 34. Near the lower end of the shaft 43 there is provided a disk 47, which is permanently fixed to the shaft. Below this disk there is provided a hand wheel 48 for controlling the shaft 43. On the upper surface of the plate 47 there is provided a leather surface 49. Just above this leather surface there is a plate 50 supported by the link 51 to the post 52, which is a part of the frame 34. This link 51 is pivoted at the points 53 and 54. The plate 50 is also sustained by another link 55, which is secured to the lever 37. This link 55 is pivoted at the points 56 and 57. The under side of the plate 50 is also provided with a leather surface 58. The upper side of the fly wheel 36 is provided with a leather surface 59, while the under side of the record holding disk 44 is likewise provided with a leather surface 60. The lever 37 is controlled by a cam wheel 61, which wheel is in turn controlled by the solenoid 62, the core 63 of which carries a pawl 64. It will be seen that when the shaft 29 is rotated, the fly wheel 36 is rotated through the medium of the worm 30, gear wheel 31, and shafts 32 and 35. Now, if the solenoid 62 is energized, the plunger 63 raises the pawl 64, which latter by engaging the tooth wheel 64 rotates the cam wheel 61 until the pawl 64 strikes the bumping post 66. As a result, the tooth 67 on the cam wheel 61 by engaging the roller 68 on the lever 37, raises the lever, the roller 68 resting for the time being on the top of the tooth 67, even though the magnet 62 deënergizes and the plunger 63 be withdrawn. As a result of raising the lever 37, the fly wheel 36 is raised into engagement with the disk 44, whereupon the disk 44 immediately starts rotating with the fly wheel 36 and at the same speed. This occurs with practically no slipping between the surfaces 59 and 60, and therefore the disk 44 attains its maximum speed almost instantly, and in fact, instantly for all practical purposes. This rotation of the disk 44 continues until the magnet 62 is energized again, whereupon the pawl 64 advances the cam wheel 61 another step, with the result that the roller 68 on the arm 37 falls in the notch 69. When this occurs the fly wheel 36 disengages from the plate 44, and at the same time the plate 50 at the other end of the shaft is carried into engagement with the shaft disk 47, thereby bringing the disk 44 instantly to a standstill.

Having described the mechanism in detail, it will now be explained how the automatic control of the phonographic equipment is carried on from the film. Assuming that the film has been set in place and that the projector has started (Fig. 1), and that the proper phonographic records which are to be used in connection with the film have been placed in position on the turn tables A and B, the automatic operation is as follows: As soon as the film is placed in position and the fire door 69' opposite the aperture plate is closed, the rollers 13, 14 and 15 are pressed in with the result that the spring contacts 11 and 12 are opened, whereas the spring contact 13 is closed. As a result of the closure of the spring 13 an energizing circuit is closed through the circuit breaker magnet 70 and through the Raymond brake magnet 71 (see Fig. 11).

As soon as magnet 71 energizes, armature 72 is attracted against the tension of the spring 73, thereby causing the right hand end of the lever 90 to rotate about a pivot 91 against the tension of the spring 75, thereby causing the pressure of the clamp 78 on the shaft 79 to be relieved. The attendant now throws in a circuit breaker switch C; and since the magnet 70 is energized the circuit is held closed by the latch on the end of the armature 80, against the tension of the spring 81. As soon as the switch C is thrown in the motor D begins to operate thereby driving the shaft 79 thereby starting the projector and the phonographic apparatus.

As the film advances an aperture on the film in line with the roller 15 permits the ridge on the circumference of the roller 15 to fall through thereby permitting the springs 12 to close, thus energizing the relay 82 which in turn closes the energizing circuit for the operating solenoid 83 of the phonograph A. This solenoid is the same as the solenoid 62. As a result the phonograph A is brought into operation. It will be understood that the closure of the springs 12 is only momentary as the aperture is only a short one. The springs 12 are immediately separated again but not until the phonograph A has been locked so as to continue operation until the next aperture again operates the roller 15, whereupon the magnet 83 is again energized and the phonograph A thrown out. In a similar manner the apertures on the same film in line with the roller 14 control the relay 84 which in turn controls the operating magnet 85, which latter is the same of course, as the magnet 83 of the phonograph A. In this manner the phonograph B may be brought into operation, and continues in operation until another aperture throws it out. Therefore the phonographs A and B may be thrown out either together or independently off and on during the operation of the film and made to work in synchronism therewith. If for any reason the film breaks the circuit at the springs 13, under the control of the roller 16, is broken whereupon the brake magnet 71 and the circuit breaker magnet 70 deënergized. The former applies a brake to the shaft 79 since the spring 75 is now free to act, and the latter, since the spring 73' is now at liberty to withdraw the catch 76 from behind the terminal 77, throws out the circuit breaker C thereby cutting off the current from the motor D.

As I have indicated in Fig. 1, the various phonographs A, B, etc., may be provided with reproducers A', B', etc., of the type shown in United States Letters Patent No. 1,185,877, which reproducers may be connected up in multiple so that they may in common have one or more receivers such as the receiver R in Fig. 1. These reproducers may be connected up with circuits as illustrated in United States Letters Patent No. 1,084,070, Fig. 1. The reproducers of the type shown are provided with two differential microphones, one on each side of the central diaphragm. Each one of these differential microphones is supplied with a circuit such as shown in Fig. 1 of the last mentioned patent. If there are several phonographs all of these differential microphones would be connected in multiple, for example, to the receiver circuit, which receiver circuit, it will be seen, is represented in the said last mentioned patent extending over two conductors to the magnet b.

It will be seen therefore that I provide an entirely efficient method of linking up a phonograph set with any moving picture machine of the standard type. All that I have to do is to remove the aperture plate with which the machine is supplied and substitute instead the aperture plate which constitutes the terminal of the cable that contains the conductors 27, 28 and 28' over which the phonographic apparatus is controlled. Then by lining up the phonograph control shaft 79 with the projector shaft 86 through the medium of any suitable coupler 87, I am ready to get synchronized service between the two devices. This can be done in just a few minutes. This is the first time that means has been provided for coupling up the two classes of apparatus without having to make any material alterations or changes in the projector.

It will thus be seen that I have provided a highly improved means for operating in conjunction a moving picture projector and phonographic apparatus. It will be seen further that this highly improved means makes it possible for the first time to quickly slap together and start operating any two equipments, the one requisite being the provision of a film with the proper punctures and the replacement of the aperture plate with the plate that constitutes the cable terminal.

I provide means also for the first time, under the control of the film, for a brake which is applied instantly that the film breaks, so as to bring the whole equipment to a standstill without having the projector and the phonograph equipment drop out of synchronism. Otherwise when the film breaks the phonographic equipment would stop independently of the projector equipment and throw the thing out of synchronism to that extent, and in the case of rupture of the film due to fire, the continued operation of the projector would merely feed down so much more of the film beyond the fire rollers, thereby feeding just that much more fuel to the flame, thus making it necessary after the attendant has patched up the film, to go to work and bring the equipment into synchronism before starting up again. It will be understood that the object in having the roller 16 higher than the rollers 14 and 15 is to insure the operation of the circuit breaker C before the broken film reaches the rollers 14 and 15. With this arrangement the circuit breaker has time to operate to disconnect the operating current from the whole system, and particularly from the relays 82 and 84 and from magnets 83 and 85, thereby insuring that the phonographic and the projector equipment are left in synchronism, notwithstanding interruption due to the breaking of the film.

It will be seen also that the motor D directly and without any intervening gearing mechanism is made to drive the common driving line of shafting containing the sections 86 and 79. The moving picture machine being of a standard type is provided with a step-down gearing between the projector shaft and the shaft 86. It will be seen also that there is a step-down gearing between the shaft 79 and the phonographs A, B, etc. On the shaft 79 I provide a fly wheel for the purpose of providing inertia sufficiently to protect the phonographs against the vibrations or variations due to the operation of the projector and due to the variations in voltage from the main line beyond the circuit breaker C. I am the first one to provide a common driving shaft directly driven by a motor supplied directly from a commercial circuit, said shaft being emloyed for driving both a phonograph machine and a moving picture machine. I am the first one to utilize inertia in this common driving shaft for protecting the phonographic equipment from the variations above mentioned.

It is thought that the applicant is a pioneer along this line and that he is entitled to broad claims.

What I claim as my invention is:

1. The combination of a switch operating moving picture film, a plate parallel to said film, a plurality of switches mounted on said plate, each switch having an element in the path of the film and controlled thereby, a circuit individual to each switch, a phonograph individual to each circuit and controlled thereover, a microphone controlled by each phonograph, a circuit common to said microphones, and a receiver under the control of said microphones in common, a driving element for operating the film and for operating the phonographs, and means controlled by one of said switches for stopping the driving element.

2. In a moving picture machine, a shaft, a film controlled thereby, an electrically controlled driving mechanism for said shaft, a circuit for supplying said mechanism with operating current, a circuit breaker in said circuit, a magnet for controlling said circuit breaker, a circuit for said magnet under the control of said film whereby if the film breaks said circuit breaker is operated to open the supply circuit, and a brake associated with said shaft, a magnet for controlling said brake, a circuit for said magnet, said circuit under the control of said film whereby if a film breaks the shaft is brought to a standstill by the application of said brake.

3. In a moving picture machine, a shaft, a film and a phonograph driven thereby, means for driving the shaft, a circuit for controlling said means, a circuit controlled for said circuit whereby if the film breaks said circuit controller is operated to stop the driving mechanism, a brake associated with said shaft, a circuit for controlling said brake, said circuit under the control of said film, whereby if the film breaks the shaft and phonograph are brought to a standstill simultaneously.

4. In a moving picture machine, a shaft, a film and a phonograph driven thereby, means for driving the shaft, a brake associated with said shaft, a circuit for controlling said brake, said circuit under the control of said film, whereby if the film breaks the shaft and phonograph are brought to a standstill instantly through the medium of said brake.

5. The combination of a moving picture machine and a phonograph, a film for the moving picture, a motor for driving the phonograph and moving picture, a circuit for said motor, a circuit breaker for said circuit, a brake for stopping said machine and phonograph, and means controlled by the film for stopping the motor through the medium of said circuit breaker and for applying said brake whereby the phonograph and moving picture machine may be brought to an immediate standstill.

6. The combination of a moving picture machine and a phonograph, a film for the moving picture, a motor for driving the phonograph and moving picture, a circuit for said motor, a circuit breaker for said circuit, a brake for positively stopping said machine and phonograph, and a common circuit for said brake and circuit breaker controlled by the film for stopping the motor and applying said brake whereby the phonograph and film may be brought to a standstill.

7. In combination with a moving picture machine and a plurality of phonographs, of a common driving shaft for driving said machine and phonographs, a clutch for each phonograph for connecting said phonographs successively or simultaneously with said driving shaft, a motor, having a circuit, for driving said shaft, a circuit breaker for said circuit, a brake for stopping said shaft, and film controlled switches for controlling said clutches, brake and circuit breaker in any desired succession, whereby the film and phonograph are maintained in synchronism.

8. The combination of a moving picture machine and a phonograph having a common driving shaft for operating the machine and phonograph, and means for bringing said phonograph successively into engagement with said driving shaft and maintaining the phonograph in synchronism with the film, a plurality of switches controlled by the film, and means controlled by certain of said switches for stopping the machine and by certain others for removing the phonographs from engagement with the driving shaft and at the same time applying a brake which stops said phonographs instantly.

Signed by me at Chicago, Illinois, this 28 day of June, 1915.

W. M. CLARK.

Witnesses:
W. W. OWEN,
HERBERT W. KRAEKE.